United States Patent
Noie

(10) Patent No.: US 8,330,406 B2
(45) Date of Patent: Dec. 11, 2012

(54) MOTOR DRIVE CIRCUIT

(75) Inventor: Joji Noie, Ota (JP)

(73) Assignees: SANYO Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 324 days.

(21) Appl. No.: 12/710,848

(22) Filed: Feb. 23, 2010

(65) Prior Publication Data
US 2010/0219783 A1    Sep. 2, 2010

(30) Foreign Application Priority Data
Feb. 27, 2009  (JP) .................................. 2009-046353

(51) Int. Cl.
*H02P 6/08* (2006.01)
(52) U.S. Cl. ......... 318/400.29; 318/400.26; 318/400.01; 318/700
(58) Field of Classification Search ............ 318/400.29, 318/400.26, 400.01, 700
See application file for complete search history.

(56) References Cited

U.S. PATENT DOCUMENTS

| | | | | |
|---|---|---|---|---|
| 5,952,856 A | * | 9/1999 | Horiguchi et al. | 327/110 |
| 6,175,204 B1 | * | 1/2001 | Calamatas | 318/375 |
| 7,755,312 B2 | * | 7/2010 | Hirata | 318/400.29 |
| 8,044,617 B2 | * | 10/2011 | Lee | 318/380 |

FOREIGN PATENT DOCUMENTS

| | | |
|---|---|---|
| JP | 2005-269885 | 9/2005 |
| JP | 2007-259657 | 10/2007 |

* cited by examiner

*Primary Examiner* — Walter Benson
*Assistant Examiner* — David Luo
(74) *Attorney, Agent, or Firm* — Morrison & Foerster LLP

(57) ABSTRACT

This invention provides a motor drive circuit, which makes it possible to prevent braking when a power supply voltage is lower than a predetermined voltage while suppressing at a low cost a rise in a voltage on a power supply line when a kickback occurs. The motor drive circuit is formed to include first and second power supply lines connected with and shunted from a power supply, an H-bridge circuit, and a means to control the H-bridge circuit. The means controls the H-bridge circuit so that a regeneration path is not created in the H-bridge circuit when the power supply voltage is lower than a predetermined voltage.

7 Claims, 3 Drawing Sheets

US 8,330,406 B2

MOTOR DRIVE CIRCUIT

CROSS-REFERENCE OF THE INVENTION

This application claims priority from Japanese Patent Application No. 2009-046353, the content of which is incorporated herein by reference in its entirety.

BACKGROUND OF THE INVENTION

1. Field of the Invention

This invention relates to a motor drive circuit.

2. Description of the Related Art

When driving a motor with an H-bridge circuit, it is necessary to prevent MOSFETs from being destroyed by a rise in a voltage caused at an occurrence of a kickback.

Japanese Patent Application Publication No. 2005-269885 discloses a method to suppress the rise in the voltage at the occurrence of the kickback using a Zener diode, for example. However, the method requires increasing a size of the Zener diode as a size of the motor increases, resulting in a higher cost of the motor drive circuit.

On the other hand, Japanese Patent Application Publication No. 2007-259657 discloses a motor drive circuit that prevents the destruction of the MOSFET at a low cost by suppressing the rise in the voltage at the occurrence of the kickback.

The motor drive circuit disclosed in Japanese Patent Application Publication No. 2007-259657 is specifically described hereafter, referring to FIG. 3. The motor drive circuit is formed to include P-channel type MOSFETs 11 and 12, N-channel type MOSFETs 13 and 14, power supply lines 21 and 22, a ground line 23, diodes 24 and 25, capacitors 26 and 27, electric current sources 31 and 32, NPN type transistors 41-48, PNP type transistors 51 and 52, a control circuit 60 and a connector 70. Each of the MOSFETs 11-14 is provided with each of parasitic diodes 11d-14d, respectively. A gate of each of the P-channel type MOSFETs 11 and 12 is connected to the power supply line 22 through each of resistors 33 and 34, respectively. The power supply lines 21 and 22 are shunted from a power supply 80 that generates a voltage VA, and are connected with a positive voltage side of the power supply 80 through the connector 70. The ground line 23 is connected with a negative voltage side of the power supply 80 through the connector 70.

When the MOSFETs 11 and 14 are turned on and the MOSFETs 12 and 13 are turned off in the structure described above, an electric current flows from the power supply line 21 to the ground line 23 through the MOSFET 11, a motor coil 10 and the MOSFET 14 to rotate the motor. Then, when the MOSFET 11 and the MOSFET 14 are turned off at a certain timing, energy accumulated in the motor coil 10 works to keep the electric current flowing. For that reason, the electric current flows through the parasitic diode 13d, the motor coil 10 and the parasitic diode 12d. In other words, a kickback is caused. The electric current caused by the kickback can be not recovered to the power supply 80 for regeneration because of the diode 24, and ends up in flowing into the capacitor 26. As a result, a voltage Vm on the power supply line 21 is raised. Then, the MOSFETs 11 and 12 are turned on when the voltage Vm on the power supply line 21 rises enough so that a voltage between a gate and a source of each of the MOSFETs 11 and 12 exceeds a threshold voltage. Therefore, the electric current outputted from the motor coil 10 returns to the motor coil 10 after flowing through the MOSFETs 12 and 11. That is, the energy accumulated in the motor coil 10 is dissipated in a loop composed of the motor coil 10 and the MOSFETs 12 and 11. Also, the rise in the voltage Vm on the power supply line 21 is suppressed to prevent the MOSFETs 11 and 12 from being destroyed by means of turning the MOSFETs 11 and 12 on.

As described above, with the motor drive circuit disclosed in the Japanese Patent Application Publication No. 2007-259657, the rise in the voltage Vm on the power supply line 21 at the occurrence of the kickback can be suppressed to prevent the MOSFETs 11 and 12 from being destroyed without using a Zener diode that is used in the method disclosed in Japanese Patent Application Publication No. 2005-269885.

With the motor drive circuit disclosed in Japanese Patent Application Publication No. 2007-259657, however, there are cases in which the loop composed of the motor coil 10 and the MOSFETs 12 and 11 is formed even when the voltage VA of the power supply 80 is reduced to less than a predetermined voltage (including a case where the power supply 80 is turned off). When the power supply 80 is turned off while the motor is rotating, for example, the motor keeps rotating for a while due to inertia. Then, varying magnetic flux in the motor coil 10 induces a voltage. In this case, the voltage at the source of each of the MOSFETs 11 and 12 rises since the voltage Vm on the power supply line 21 rises in response to the induced voltage. On the other hand, a voltage at the gate of each of the MOSFETs 11 and 12 is practically equal to zero when the power supply 80 is turned off in accordance with a voltage Vcc on the power supply line 22. Therefore, the MOSFETs 11 and 12 are turned on despite the power supply 80 is turned off. In this case, the motor coil 10 causes a braking force that is opposite in direction to the rotation of the motor.

This invention is directed to solve the problem addressed above, and intends to prevent the braking force from being caused when the power supply voltage is reduced to less than the predetermined voltage by avoiding the formation of the loop while suppressing the rise in the voltage at the occurrence of the kickback at a low cost.

SUMMARY OF THE INVENTION

The invention provides a motor drive circuit that includes a first power supply line and a second power supply line that are connected to a power supply, and an H-bridge circuit. This circuit includes a first source transistor, a first sink transistor, a second source transistor and a second sink transistor. The first source transistor and the first sink transistor are connected in series, and the second source transistor and the second sink transistor are connected in series. Each of the first and second source transistors and the first and second sink transistors is connected to a corresponding regeneration diode. The first power supply line is connected to an input electrode of the first source transistor and an input electrode of the second source transistor, and a motor coil is connected between an output electrode of the first source transistor and an output electrode of the second source transistor. The motor drive circuit also includes a control circuit connected to the second power supply line and controlling the H-bridge circuit so that the first source transistor and the second sink transistor are turned on and off together so as to complement turning on and off of the second source transistor and the first sink transistor and so that the first and second source transistors are not turned on regardless of a voltage on the first power supply line when a voltage on the power supply is smaller than a predetermined voltage.

DETAILED DESCRIPTION OF THE INVENTION

A motor drive circuit according to an embodiment of this invention is hereafter described in detail.

Figure 1:
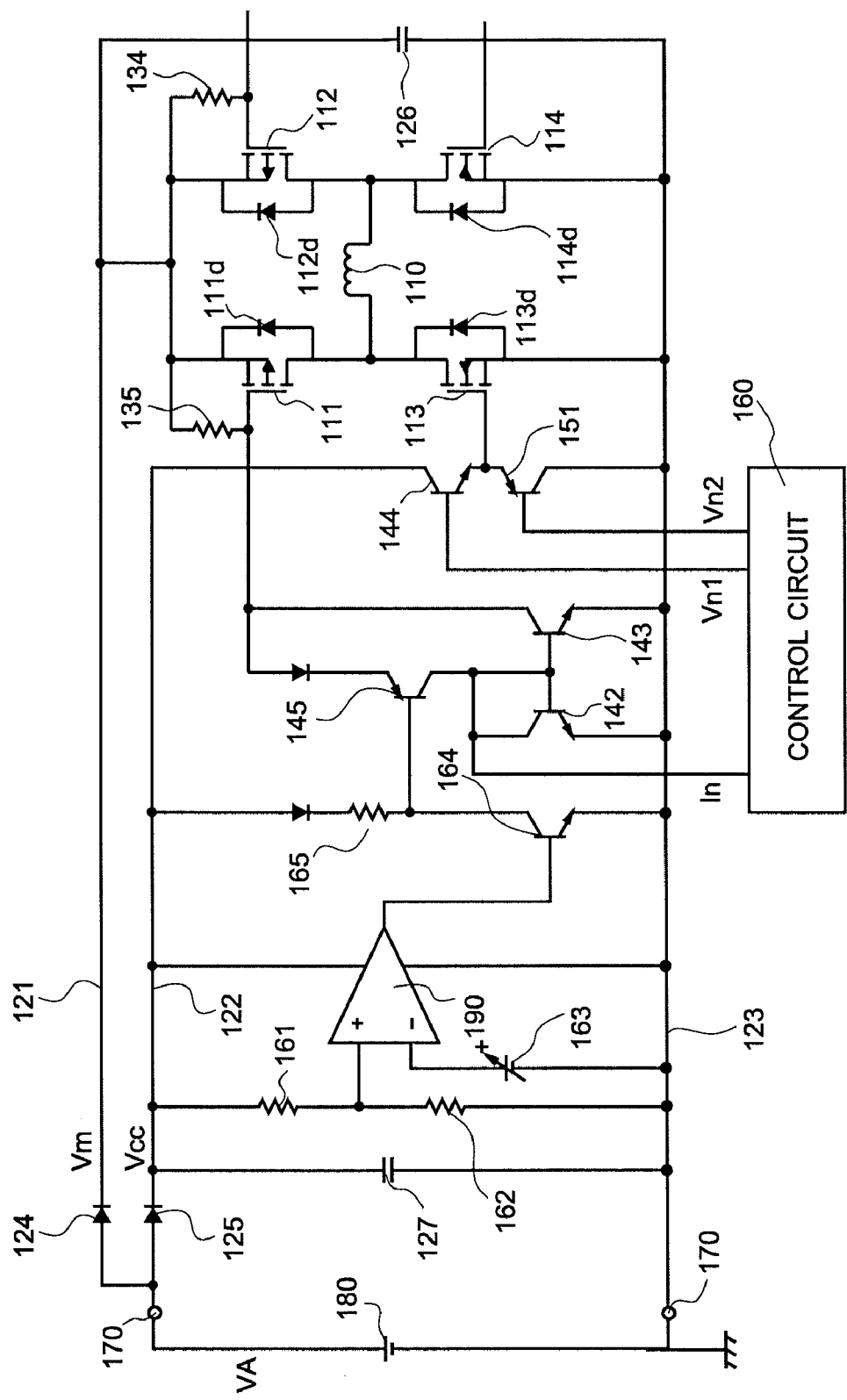
FIG. 1 shows an example of a structure of a motor drive circuit according to an embodiment of this invention.

FIG. 1 shows an example of a structure of the motor drive circuit according to the embodiment of this invention. The motor drive circuit drives a single-phase motor such as a fan motor, for example, and controls an electric current flowing through a motor coil 110. The motor drive circuit is formed to include P-channel type MOSFETs 111 and 112, N-channel type MOSFETs 113 and 114, power supply lines 121 and 122, a ground line 123, diodes 124 and 125, capacitors 126 and 127, NPN type transistors 142-144, and 164, PNP type transistors 145 and 151, a control circuit 160, a comparator 190, resistors 161, 162 and 135, a reference voltage source 163, and a connector 170.

First, the structure of the motor drive circuit according to the embodiment is described in detail.

The MOSFETs 111-114 constitute an H-bridge circuit. To describe the H-bridge circuit more in detail, sources of the MOSFETs 111 and 112 are connected to the power supply line 121. Also, sources of the MOSFETs 113 and 114 are connected to the ground line 123. Drains of the MOSFETs 111 and 113 are connected with each other, while drains of the MOSFETs 112 and 114 are connected with each other. The motor coil 110 is connected between a connecting node between the MOSFETs 111 and 113 and a connecting node between the MOSFETs 112 and 114. Each of the MOSFETs 111-114 is provided with each of parasitic diodes 111d-114d, respectively.

The power supply lines 121 and 122 are shunted from a power supply 180 that generates a voltage VA, and are connected with a positive voltage side of the power supply 180 through the connector 170. The ground line 123 is connected with a negative voltage side (ground side) of the power supply 180 through the connector 170. The power supply line 121 is provided with a diode 124 in order to prevent an electric current from flowing from the power supply line 121 to the power supply 180 and destroying the motor drive circuit. Similarly, the power supply line 122 is provided with a diode 125. The power supply line 121 is also provided with a capacitor 126 in order to absorb an electric current that would be caused when a kickback would occur in the H-bridge circuit. The power supply line 122 is provided with a capacitor 127 in order to stabilize a voltage Vcc on the power supply line 122.

The comparator 190, the resistors 161 and 162 and the reference voltage source 163 constitute a circuit to monitor a voltage VA of the power supply 180. To be more specific, the monitoring circuit monitors whether the electric voltage VA of the power supply 180 is lower than a predetermined voltage or not. A voltage generated by dividing the voltage Vcc on the power supply line 122 by the resistors 161 and 162 is inputted to a non-inverting input terminal + of the comparator 190. A voltage set by the reference voltage source 163 is inputted to an inverting input terminal − of the comparator 190. The comparator 190 outputs an H level when the voltage generated by dividing the voltage Vcc on the power supply line 122 by the resistors 161 and 162 is larger than the voltage of the reference voltage source 163, and outputs an L level when the voltage generated by dividing the voltage Vcc on the power supply line 122 by the resistors 161 and 162 is smaller than the voltage of the reference voltage source 163.

The transistors 142 and 143 and the resistor 135 constitute a circuit to control the MOSFET 111. One end of the resistor 135 is connected with the source of the MOSFET 111, while the other end of the resistor 135 is connected with a gate of the MOSFET 111. An emitter of each of the transistors 142 and 143 is connected to the ground line 123, and the transistors 142 and 143 are connected so as to form a current mirror. A collector of the transistor 142 is connected with the gate of the MOSFET 111 and the other end of the resistor 135 through the transistor 145 and a diode. An electric current In from the control circuit 160 is inputted to a collector of the transistor 142 and bases of the transistors 142 and 143.

The transistors 164 and 145 and a resistor 165 constitute a circuit to prevent the MOSFET 111 from turning on when the voltage VA of the power supply 180 is lower than the predetermined voltage (including the case where the power supply 180 is turned off) even when the kickback takes place. An output of the comparator 190 is inputted to a base of the transistor 164, while its emitter is connected to the ground line 123 and its collector is connected to one end of the resistor 165. An emitter of the transistor 145 is connected with the gate of the MOSFET 111 and the other end of the resistor 135, while its collector is connected with the bases of the transistors 142 and 143 and its base is connected with the one end of the resistor 165. When the voltage VA of the power supply 180 is higher than the predetermined voltage, a voltage inputted to the base of the transistor 164 rises to turn the transistor 164 on, and a voltage inputted to the base of the transistor 145 is lowered to turn the transistor 145 on. When the voltage VA of the power supply 180 is lower than the predetermined voltage, the transistors 165 and 145 are turned off.

The transistors 144 and 151 constitute a circuit to control turning on/off of the MOSFET 113. Emitters of the transistors 144 and 151 are connected with each other. A collector of the transistor 144 is connected with the power supply line 122 while a collector of the transistor 151 is connected with the ground line 123. A voltage Vn1 outputted from the control circuit 160 is applied to a base of the transistor 144 while a voltage Vn2 outputted from the control circuit 160 is applied to a base of the transistor 151. A connecting node between the transistors 144 and 151 is connected with a gate of the MOSFET 113.

Although the MOSFETs 112 and 114 are provided with control circuits that are identical to the control circuits of the MOSFETs 111 and 113 in the actual circuit, circuit diagrams of the control circuits of the MOSFETs 112 and 114 and explanations on them are omitted because they are practically the same as those of the control circuits of the MOSFETs 111 and 113.

The control circuit 160 controls the turning on/off of the MOSFETs 111 and 113 through the electric current In and the voltages Vn1 and Vn2, and controls the driving of the motor.

Next, operations of the motor drive circuit according to the embodiment are described in detail.

First, a case in which the voltage VA of the power supply 180 is higher than the predetermined voltage (the case of a normal operation mode, for example) is described.

In the case where the power supply 180 is turned on and the voltage VA is higher than the predetermined voltage, the voltage inputted to the non-inverting input terminal + of the comparator 190 is higher than the voltage inputted to the inverting input terminal −. Then, the transistor 164 is turned on because the comparator 190 outputs the H level.

When the control circuit 160 outputs the electric current In and the voltages Vn1 and Vn2 of the L level in this state, the electric current In flows into the transistor 142 and induces an electric current corresponding to a mirror ratio in the transistor 143 that is connected with the transistor 142 to form the current mirror. The electric current flows through the resistor 135 as a result, and a voltage dropped from a voltage Vm on the power supply line 121 is applied to the gate of the MOSFET 111 to turn the MOSFET 111 on. Since the transistor 144 is turned off and the transistor 151 is turned on, on the other hand, a voltage at the gate of the MOSFET 113 becomes the L level to turn the MOSFET 113 off. Also, the MOSFET 112 is turned off and the MOSFET 114 is turned on by predetermined signals. Then, an electric current flows from the power supply line 121 to the ground line 123 through the MOSFET 111, the motor coil 110 and the MOSFET 114 to rotate the motor in a certain direction.

Then, the control circuit 160 terminates outputting the electric current In at a certain timing while keeping the voltages Vn1 and Vn2 at the L level. As a result, no electric current flows through the resistor 135, and the MOSFET 111 is turned off On the other hand, the transistor 144 remains turned off, the transistor 151 remains turned on, and the MOSFET 113 remains turned off. Also, the MOSFETs 112 and 114 are turned off by the predetermined signals. In this case, the energy accumulated in the motor coil 110 works to keep the electric current flowing. As a result, an electric current flows through the parasitic diode 113d, the motor coil 110 and the parasitic diode 112d. That is, the kickback takes place. The electric current caused by the kickback can not be recovered to the power supply 180 for regeneration because of the diode 124, and ends up in flowing into the capacitor 126. As a result, the voltage Vm on the power supply line 121 rises. When the voltage Vm on the power supply line 121 rises, an electric current flows through the resistor 135 since the transistor 145 is turned on, and there is caused an electric potential difference between the gate and the source of the MOSFET 111. When the voltage between the gate and the source of each of the MOSFETs 111 and 112 exceeds the threshold voltage, the MOSFETs 111 and 112 are turned to an ON state automatically. Therefore, the electric current outputted from the motor coil 110 returns to the motor coil 110 after flowing through the MOSFETs 112 and 111. That is, the energy accumulated in the motor coil 110 is dissipated in a loop on a power supply side of the H-bridge circuit composed of the motor coil 110 and the MOSFETs 112 and 111. After the energy accumulated in the motor coil 110 is consumed and the voltage between the gate and the source of each of the MOSFETs 111 and 112 is reduced to less than the threshold voltage, the MOSFETs 111 and 112 are turned off automatically.

After that, the control circuit 160 terminates outputting the electric current In, and outputs the voltages Vn1 and Vn2 at the H level. As a result, the MOSFET 111 is turned off. On the other hand, the MOSFET 113 is turned on since the transistor 144 is turned on and the transistor 151 is turned off. Also, the MOSFET 112 is turned on and the MOSFET 114 is turned off by the predetermined signals. In this case, an electric current flows from the power supply line 121 to the ground line 123 through the MOSFET 112, the motor coil 110 and the MOSFET 113.

Then, the control circuit 160 once again outputs the voltages Vn1 and Vn2 at the L level at a certain timing, while not outputting the electric current In. No electric current flows through the resistor 135 and the MOSFET 111 remains turned off On the other hand, the MOSFET 113 is turned off, since the transistor 144 is turned off and the transistor 151 is turned on. Also, the MOSFETs 112 and 114 are turned off by the predetermined signals. In this case, the energy accumulated in the motor coil 110 works to keep the electric current flowing. As a result, the electric current flows through the parasitic diode 114d, the motor coil 110 and the parasitic diode 111d of the P-channel type MOSFET 111. That is, the kickback takes place in this case also. The electric current caused by the kickback can not be recovered to the power supply 180 for regeneration because of the diode 124, and ends up in flowing into the capacitor 126 to raise the voltage Vm on the power supply line 121. When the voltage Vm on the power supply line 121 rises, an electric potential difference is caused between the gate and the source of the MOSFET 111 since the transistor 145 is turned on. When the voltage between the gate and the source of each of the MOSFETs 111 and 112 exceeds the threshold voltage, the MOSFETs 111 and 112 are turned to the ON state automatically. Therefore, the electric current outputted from the motor coil 110 returns to the motor coil 110 after flowing through the MOSFET 111 and the MOSFET 112. In this case also, the energy accumulated in the motor coil 110 is dissipated in the loop on the power supply side of the H-bridge circuit. After the energy accumulated in the motor coil 110 is consumed and the voltage between the gate and the source of each of the MOSFETs 111 and 112 is reduced to less than the threshold voltage, the MOSFETs 111 and 112 are turned off automatically.

With the motor drive circuit according to the embodiment of this invention, the rise in the voltage Vm on the power supply line 121 caused by occurrence of the kickback is suppressed within the voltage that is higher only by the threshold voltage than the voltage at the gate of each of the MOSFETs 111 and 112, even if the kickback occurs when the voltage VA of the power supply 180 is higher than the predetermined voltage. As a result, the destruction of the MOSFETs 111 and 112 is prevented since an excessive voltage is not applied to the MOSFETs 111 and 112.

Next, a case in which the voltage VA of the power supply 180 is lower than the predetermined voltage (the case where the power supply is turned off, or in a waiting mode, for example) is described.

In the case where the voltage VA of the power supply 180 is lower than the predetermined voltage, the voltage inputted to the non-inverting input terminal + of the comparator 190 is lower than the voltage inputted to the inverting input terminal − because the voltage Vcc on the power supply line 122 is lowered. Then, the transistor 164 is turned off because the comparator 190 outputs the L level.

In this state, when the motor keeps rotation due to the inertia even though the voltage VA of the power supply 180 is reduced to lower than the predetermined voltage, for example, there is induced a voltage due to varying magnetic flux in the motor coil 110. In this case, the voltage at the source of each of the MOSFETs 111 and 112 (=the voltage Vm on the power supply line 121) rises as in the motor drive circuit according to the prior art, since the voltage Vm on the power supply line 121 is raised in response to the induced voltage. In the motor drive circuit according to the embodiment, however, the transistor 145 is turned off when the voltage VA on the power supply 180 is lower than the predetermined voltage. As a result, no electric current flows through the resistor 135, and no substantial electric potential difference is caused between the gate and the source of the MOSFET 111. Similarly, no substantial electric potential difference is caused between the gate and the source of the MOSFET 112 as well. That is, even when the kickback occurs, no braking force is caused in the motor coil 110 when the voltage VA on the power supply 180 is lower than the predetermined voltage, because the MOSFETs 111 and 112 are not turned on.

In the case where the power supply 180 is turned off, the transistor 164 is turned off because the comparator 190 is turned off. As a result, as in the case where the voltage VA of the power supply 180 is lower than the predetermined voltage, no braking force is caused in the motor coil 110 even if the kickback occurs when the power supply 180 is turned off, since the MOSFETs 111 and 112 are not turned on.

The motor drive circuit according to the embodiment of this invention has been described in detail. The destruction of the device due to the occurrence of the kickback can be prevented without using a large Zener diode with the motor drive circuit according to the embodiment, since the rise in the voltage Vm on the power supply line 121 can be suppressed in the case where the voltage VA on the power supply line 180 is higher than the predetermined voltage, even if the kickback occurs. In the case where the voltage VA on the power supply 180 is lower than the predetermined voltage, even when the voltage is induced in the motor coil 110, the MOSFETs 111 and 112 are not turned on and the braking force is prevented from being caused.

It is noted that the embodiment described above is presented to make understanding this invention easier, and should not be regarded as to limit the scope of this invention. The embodiment of this invention may be modified or improved within the scope of this invention, and may include its equivalents.

For example, although the motor drive circuit according to the embodiment uses the H-bridge circuit to control the electric current flowing through the motor coil of the single-phase fan motor, for example, this invention is not limited to be applied to the fan motor or to the single-phase motor.

Also, although the source transistors in the H-bridge circuit are made of P-channel type MOSFETs in the motor drive circuit according to the embodiment, the source transistors may be made of PNP type transistors. The source transistor in the H-bridge circuit may be made of any transistor as long as it is turned on/off in response to a voltage difference between its electrode on the side of the power supply line 121 and its control electrode. In the case where the source transistors are made of PNP type transistors, each of the PNP type transistors may be provided with a diode for regeneration connected in parallel to itself.

Also, although the sink transistors in the H-bridge circuit are made of N-channel type MOSFETs in the motor drive circuit according to the embodiment, the sink transistors may be made of P-channel type MOSFETs or may be made of bipolar transistors. For example, the sink transistors may be made of NPN type transistors. In the case where the sink transistors are made of bipolar transistors, each of the bipolar transistors may be provided with a diode for regeneration connected in parallel to itself.

The power supply line 121 and the power supply line 122 are shunted from the single power supply 180 in the motor drive circuit according to the embodiment of this invention. Not limited to the above, the power supply line 121 and the power supply line 122 may be connected to two different power supplies, respectively. In the case where the power supply line 121 and the power supply line 122 are connected to the two different power supplies respectively, a voltage on the power supply line 122 is good enough so long as it can turn off the MOSFET 112 when the electric current flows from the MOSFET 111 to the MOSFET 114. For example, the power supply line 121 may be connected to one of two power supplies that generate the voltage VA, while the power supply line 122 may be connected to the other of the two power supplies.

Figure 2:
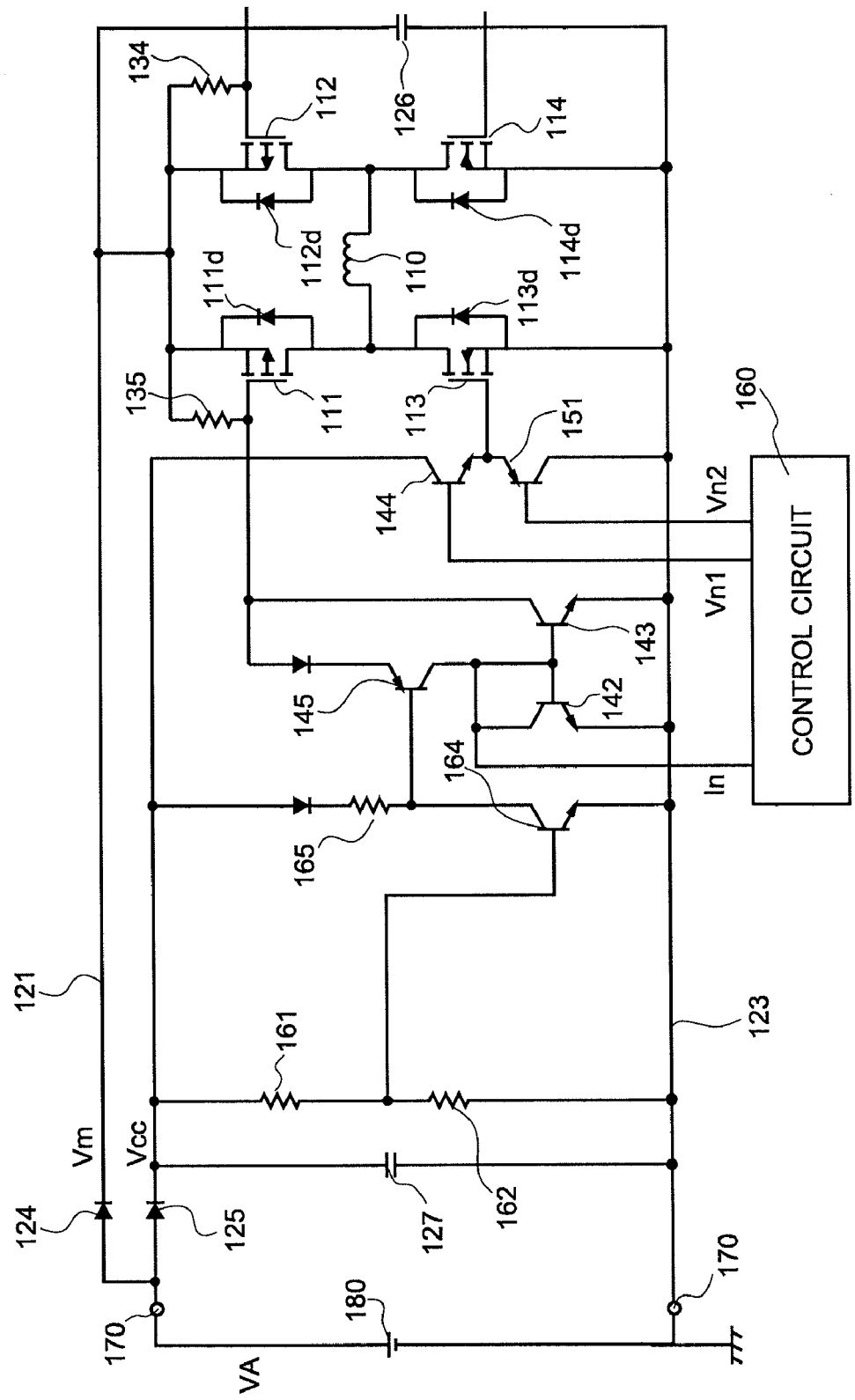
FIG. 2 shows an example of a structure of a motor drive circuit according to another embodiment of this invention.
Figure 3:
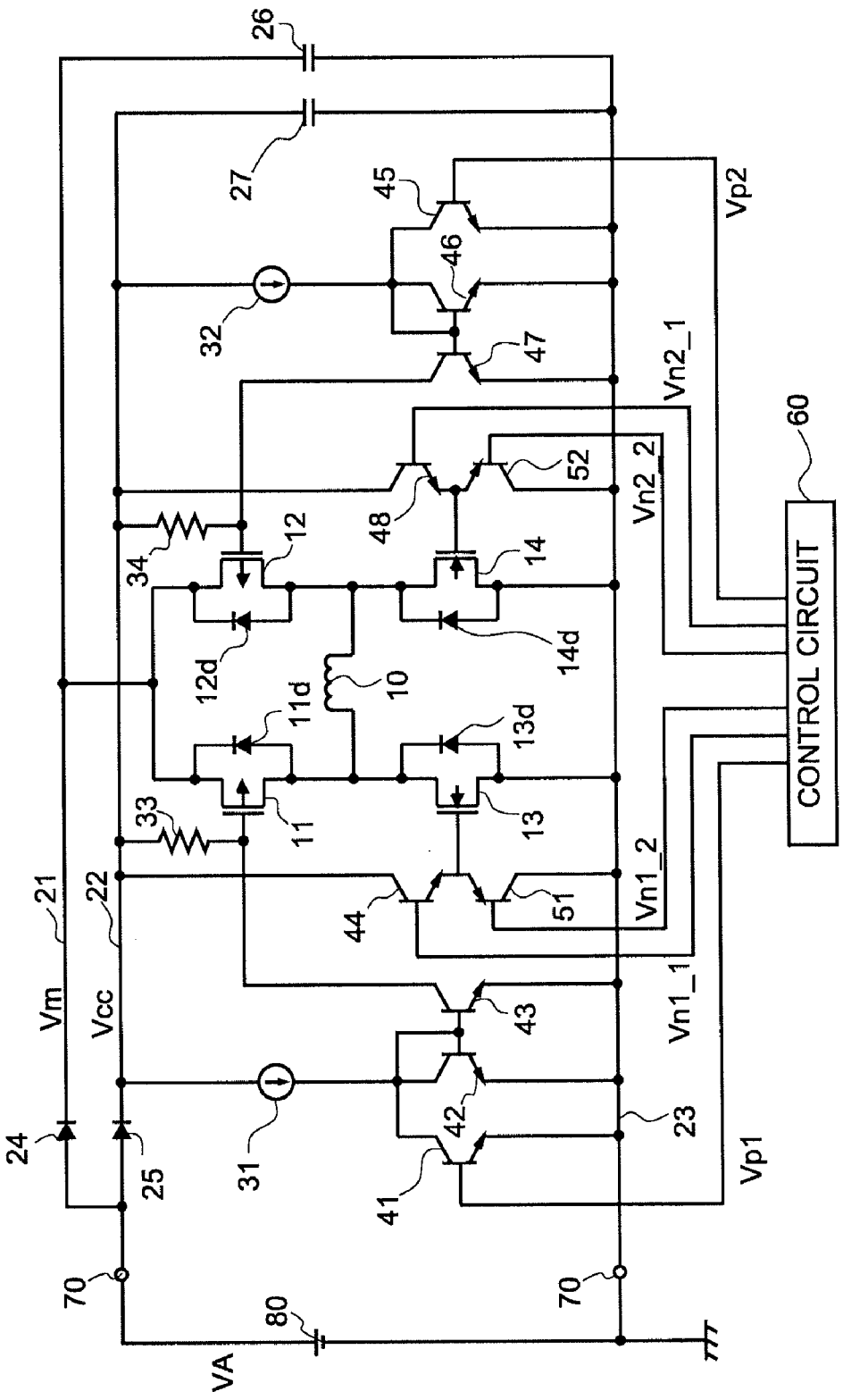
FIG. 3 shows an example of a structure of a motor drive circuit disclosed in Japanese Patent Application Publication No. 2007-259657.

The voltage VA of the power supply 180 is monitored using the comparator 190, the resistors 161 and 162 and the reference voltage source 163 in the motor drive circuit according to the embodiment of this invention. This invention is not limited to the above, and the voltage generated by dividing the voltage Vcc by the resistors 161 and 162 may be directly inputted to the base of the transistor 164, as shown in FIG. 2. In this case, however, it must be noted that temperature dependence of the resistors 161 and 162 exerts greater influence on characteristics of the motor drive circuit compared with the motor drive circuit according to the embodiment of this invention shown in FIG. 1.

The motor drive circuits of these embodiments prevent the braking force when the power supply voltage is lower than the predetermined voltage, while suppressing at a low cost the rise in the voltage at the occurrence of the kickback.

What is claimed is:

1. A motor drive circuit comprising:
a first power supply line and a second power supply line that are connected to a power supply, and a ground line that is not the first power supply line or the second power supply line; an H-bridge circuit comprising a first source transistor, a first sink transistor, a second source transistor and a second sink transistor, the first source transistor and the first sink transistor being connected in series, the second source transistor and the second sink transistor being connected in series, each of the first and second source transistors and the first and second sink transistors being connected to a corresponding regeneration diode, the first power supply line being connected to an input electrode of the first source transistor and an input electrode of the second source transistor, and a motor coil being connected between an output electrode of the first source transistor and an output electrode of the second source transistor; and a control circuit connected to the second power supply line and controlling the H-bridge circuit so that the first source transistor and the second sink transistor are turned on and off together so as to complement turning on and off of the second source transistor and the first sink transistor and so that the first and second source transistors are not turned on regardless of a voltage on the first power supply line when a voltage on the second power supply line is smaller than a predetermined voltage, wherein the second power supply line is connected to a current mirror circuit which is coupled to the first source transistor and the first sink transistor of the H-bridge.

2. The motor drive circuit of claim 1, wherein the first power supply line is connected to the power supply through a first diode, and the second power supply lined is connected to the power supply through a second diode.

3. The motor drive circuit of claim 1, wherein the regeneration diode is parasitic diode of a corresponding transistor.

4. The motor drive circuit of claim 1, wherein the power supply comprises a first supply and a second supply, and the first supply is connected to the first power supply line and the second supply is connected to the second supply line.

5. A motor drive circuit comprising:
a first power supply line and a second power supply line that are connected to a power supply;
an H-bridge circuit comprising a first source transistor, a first sink transistor, a second source transistor and a second sink transistor, the first source transistor and the first sink transistor being connected in series, the second source transistor and the second sink transistor being connected in series, each of the first and second source transistors and the first and second sink transistors being connected to a corresponding regeneration diode, the first power supply line being connected to an input electrode of the first source transistor and an input electrode of the second source transistor, and a motor coil being connected between an output electrode of the first source transistor and an output electrode of the second source transistor; and a control circuit connected to the second power supply line and controlling the H-bridge circuit so that the first source transistor and the second sink transistor are turned on and off together so as to complement turning on and off of the second source transistor and the first sink transistor and so that the first and second source transistors are not turned on regardless of a voltage on the first power supply line when a voltage on the second power supply line is smaller than a predetermined voltage, wherein the control circuit comprises a first resistor and an OFF control circuit, one end of the first resistor being connected to the input electrode of the first source transistor and the other end of the first resistor being connected to a control electrode of the first source transistor, and the OFF control circuit reducing an electric potential difference between both ends of the first resistor to a voltage smaller than a threshold voltage of the first source transistor when the voltage on the second power supply is smaller than the predetermined voltage.

6. The motor drive circuit of claim 5, wherein the OFF control circuit comprises a comparator and a control transistor, a voltage generated by dividing the voltage on the second power supply line by resistors being inputted to one of input terminals of the comparator and a reference voltage being inputted to another input terminal of the comparator, and the control transistor controlling an electric current flowing through the first resistor in response to an output of the comparator.

7. A motor drive circuit comprising:

a first power supply line and a second power supply line that are connected to a power supply;

an H-bridge circuit comprising a first source transistor, a first sink transistor, a second source transistor and a second sink transistor, the first source transistor and the first sink transistor being connected in series, the second source transistor and the second sink transistor being connected in series, each of the first and second source transistors and the first and second sink transistors being connected to a corresponding regeneration diode, the first power supply line being connected to an input electrode of the first source transistor and an input electrode of the second source transistor, and a motor coil being connected between an output electrode of the first source transistor and an output electrode of the second source transistor; and a control circuit connected to the second power supply line and controlling the H-bridge circuit so that the first source transistor and the second sink transistor are turned on and off together so as to complement turning on and off of the second source transistor and the first sink transistor and so that the first and second source transistors are not turned on regardless of a voltage on the first power supply line when a voltage on the second power supply line is smaller than a predetermined voltage, wherein the predetermined voltage is equal to the voltage on the second power supply line at the time when the power supply is turned off.

* * * * *